Nov. 25, 1969 TAMAKI TOMITA 3,480,076
OIL TEMPERATURE CONTROL SYSTEM
Filed Dec. 26, 1967 5 Sheets-Sheet 1

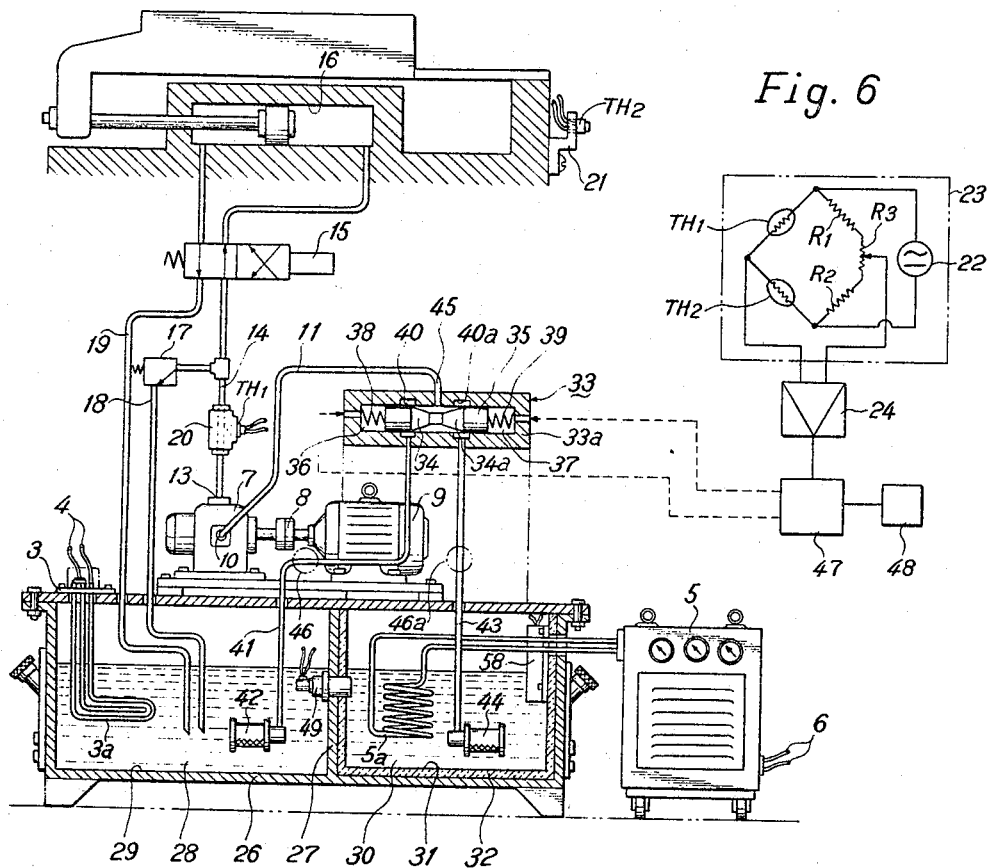

United States Patent Office 3,480,076
Patented Nov. 25, 1969

3,480,076
OIL TEMPERATURE CONTROL SYSTEM
Tamaki Tomita, % Toyoda Machine Works, Ltd.,
1, 1-chome, Asahicho, Kariya, Aichi Prefecture, Japan
Filed Dec. 26, 1967, Ser. No. 693,566
Claims priority, application Japan, Dec. 29, 1966,
42/660
Int. Cl. F25b *29/00;* F28d *15/00*
U.S. Cl. 165—27                                    7 Claims

ABSTRACT OF THE DISCLOSURE

An oil temperature control system in which there are detected the temperature of an operating oil circulating in a fluid circuit composed of a hydraulic motor and an oil reservoir and the ambient temperature of a machine operated by the hydraulic motor, the values of the detected temperatures being fed into an automatic electric balancing circuit which generates an output signal only when the difference between the temperature inputs is not of a predetermined value to actuate an oil heating or cooling means, whereby the temperature of the operating oil is varied in response to the ambient temperature.

---

The present invention relates to an oil temperature control system adapted to control the temperature of an operating oil for a hydraulic motor in response to the ambient temperature.

So far, in operating a percision machine, particularly a machine tool, of the type which is operated by hydraulic pressure, cooling means has usually been disposed in the operating oil circuit or in the oil reservoir so as to maintain the operating oil below a predetermined temperature. Namely, when the temperature of the operating oil has risen beyond, for instance, 40° C., the cooling means is actuated to cool the operating oil to 40° C. and thereby the operating oil is maintained at 40° C. throughout the period of operation. Such method, however, is not entirely satisfactory because the ambient temperature which varies with the atmospheric temperature is not taken into account. As is well known, the atmospheric temperature is lowest in the morning, rises progressively to the highest value at about 1:00 p.m., and again lowers progressively thereafter. Accordingly, the hydraulic motor and the machine to be operated thereby undergo thermal expansion and contraction repeatedly as the ambient temperature or the atmospheric temperature varies. In practice, the temperature difference between the hydraulic motor operating oil and the ambient temperature is small when the ambient temperature is relatively high but becomes great when the ambient temperature is relatively low. Therefore, the thermal expansion of various portions of the machine is greater in the case of the latter than in the case of the former. According to the conventional method as described above, therefore, the temperature difference between the operating oil temperature and the ambient temperature cannot be maintained constant and a variety of troubles are brought about due to thermal distortion.

If it is possible to maintain the temperature difference between the operating oil and the ambient temperature constant, or to control the operating oil temperature in such a manner that it varies with the ambient temperature so that the temperature difference therebetween may be maintained constant or within a certain temperature range, the thermal gradient between the operating oil at various portions of the associated machine and the ambient temperature will be maintained constant and accordingly thermal distortion of the machine can be uniformalized.

The present invention has been achieved based upon the idea set forth above. Namely, the object of the present invention is to provide an oil temperature control system capable of varying the temperature of a hydraulic motor operating oil with the ambient temperature by detecting the temperature of the operating oil circulating in the fluid circuit of the hydraulic motor including an oil reservoir, detecting the ambient temperature of a machine operated by said hydraulic motor and said hydraulic motor, and feeding the values of said respective temperatures detected into an automatic electric balancing circuit in the form of voltage, whereby a signal is emitted from said automatic electric balancing circuit only when the difference between the input voltages is not within a prescribed range to actuate adjusting means in the oil reservoir and thus the temperature of the operating oil is controlled in response to the ambient temperature. By employing the oil temperature control system of this invention as described above, it is possible to maintain the temperature difference between the operating oil for operating a hydraulic motor and the ambient temperature within a desired temperature range.

Consequently, the temperature gradient between the temmperature of the operating oil supplied from the hydraulic motor to the associated machine driven by said hydraulic motor and the ambient temperature can be maintained constant at all times or, in other words, the temperature of the operating oil does not fluctuate with respect to the ambient temperature. For instance, when the system of this invention is incorporated in the feed mechanism of a machine tool, a cycle position once set can be maintained with no deviation and thereby the precision of the machined products can be improved remarkably.

The oil temperature control system according to this invention comprises an oil reservoir for containing an operating oil therein, an oil circuit for circulating the operating oil between said oil reservoir and the associated hydraulic motor, means for circulating the operating oil through said circuit, a first temperature detector for detecting the temperature of the operating oil circulating through said circuit including said oil reservoir, a second temperature detector for detecting the ambient temperature of a machine driven by said hydraulic motor and said hydraulic motor which ambient temperature is usually lower than the temperature of said operating oil, means for heating said operating oil in said oil reservoir, means for cooling said operating oil in said oil reservoir and an automatic electric balancing circuit into which the values of the temperatures detected by said first and second detectors are fed in the form of voltage, said automatic electric balancing circuit being held in a balanced state when the difference between said input voltages is of a predetermined value but emitting a signal to either said heating means or said cooling means when the input difference deviates from the predetermined value to actuate said heating means or said cooling means for heating or cooling the operating oil in said oil reservoir, whereby the temperature of the operating oil is controlled in response to the ambient temperature.

In order that the present invention may be more fully understood, reference may be had to the accompanying drawings in which the present invention is illustrated by way of example and in which:

FIG. 5 is a diagrammatic elevational view, partly in section, of another embodiment of the oil control apparatus of this invention;

FIG. 6 is a block diagram of electrical temperature detecting means to be used with the apparatus shown in FIG. 5, in which the broken lines indicate the connection between said means and said apparatus;

Figure 1:
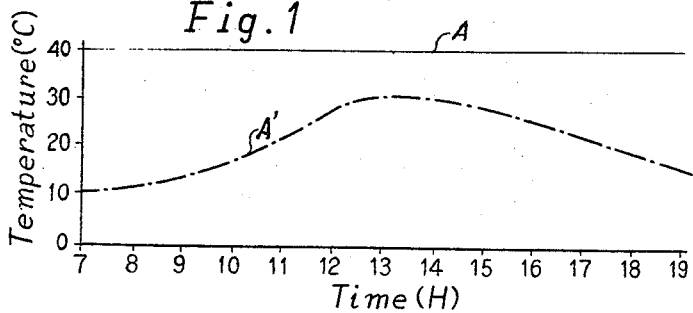
FIG. 1 is a chart illustrating the temperature change of an operating oil under control of a conventional system.
Figure 2:
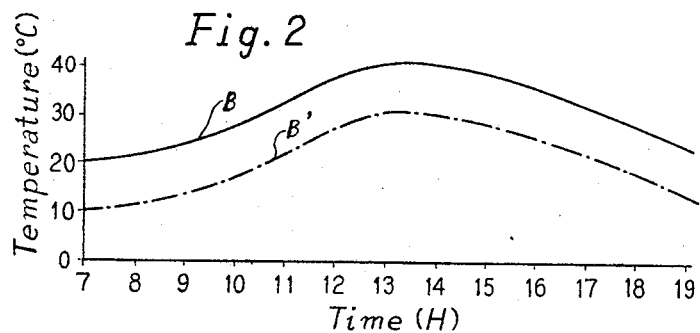
FIG. 2 is a chart, similar to FIG. 1, illustrating the temperature change of the operating oil under control of the system according to the present invention.

As described previously, the conventional oil temperature control system is only capable of maintaining the temperature of an operating oil at a constant value, e.g. at 40° C. (line A), independently of the ambient temperature (curve A′), as shown in the chart of FIG. 1. However, according to the system of this invention, the operating oil temperature (curve B) is varied with the ambient temperature (curve B′) as illustrated in the chart of FIG. 2.

Figure 3:
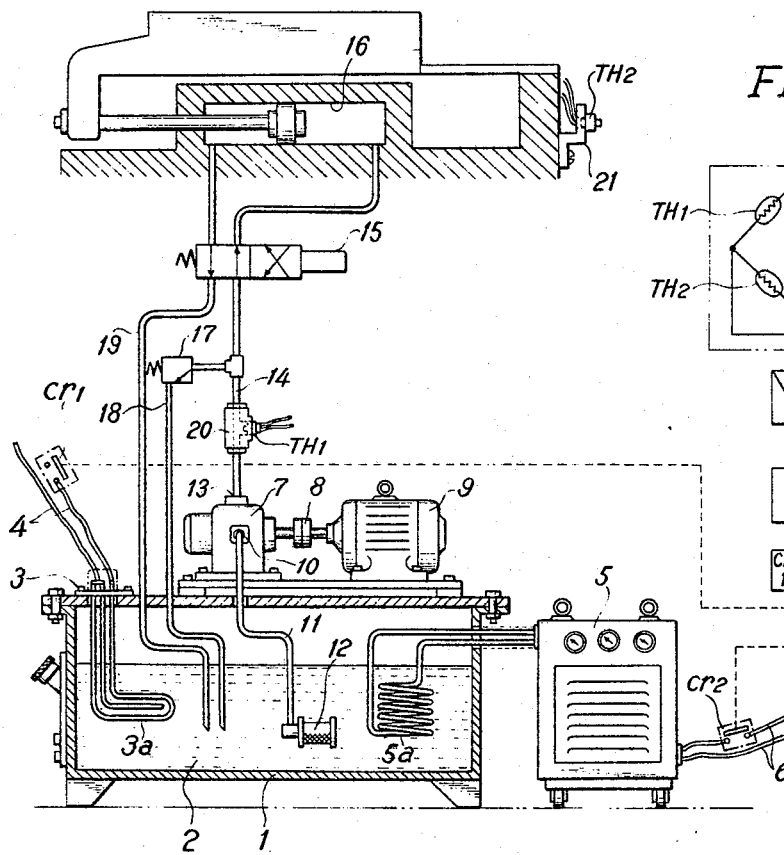
FIG. 3 is a diagrammatic elevational view, partly in section, of an embodiment of the oil temperature control apparatus according to this invention.

Referring to FIG. 3, there is shown an oil temperature control apparatus embodying the present invention. In this apparatus, an operating oil 2 contained in an oil reservoir 1 is heated by a heating pipe 3a extending from a heater 3 mounted on the top cover of the oil reservoir, and is cooled by a cooling pipe 5a extending from a cooler 5, disposed exterior of said oil reservoir 1, through the wall of said oil reservoir. The heater 3 and the cooler 5 are respectively connected to a power source, not shown, by electric wires 4 and 6. On the top cover of the oil reservoir 1 is also mounted a hydraulic pump 7 which is driven by a drive motor 9 through a coupling 8. An oil suction tube 11 has one end connected to a strainer 12 disposed in the oil reservoir 1 and the other end to the inlet 10 of the hydraulic pump 7. The outlet of the hydraulic pump 7 is in communication with a hydraulic motor or a hydraulic cylinder 16 through a pipe 14 which is provided therein with a change-over valve 15. At an intermediate portion of the pipe 14 is connected one end of a pipe 18, the other end of which is led into the oil reservoir 1 for returning an excessive oil in the pipe 14 into said oil reservoir therethrough, said pipe 18 being provided therein with a relief valve 17. The hydraulic cylinder 16 is in communication with the oil reservoir 1 through a pipe 19 to return the used oil into said oil reservoir and the passage of the returning operating oil in said pipe 19 is controlled by the aforementioned change-over valve 15.

Provided at an intermediate portion of the pipe 14 is a temperature detector TH1, consisting of, e.g. a thermistor, which is housed in a joint 20. Obviously, the temperature detector TH1 does not have to be provided at this location, but may be provided at any location at which the temperature of the operating oil can be measured. On the other hand, a similar temperature detector TH2 is provided on a bracket 21 located in the proximity of the hydraulic cylinder 16 or on the body of the associated machine to measure the ambient temperature. This second temperature detector TH2 must be shielded against the direct rays of the sun and located remote from heating sources.

Figure 4:
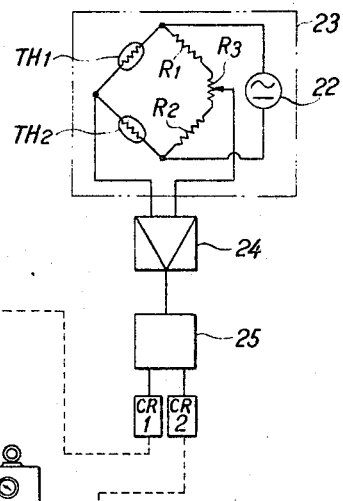
FIG. 4 is a block diagram of electrical temperature detecting means to be used with the apparatus shown in FIG. 3, in which the broken lines indicate the connection between said means and said apparatus.

An automatic electric balancing circuit to be used with the apparatus shown in FIG. 3 is shown in FIG. 4. As seen, the first temperature detector TH1 and the second temperature detector TH2 form a bridge circuit 23 in cooperation with fixed resistors R1 and R2 and a balancing variable resistor R3. The bridge circuit 23 thus formed has one opposite ends connected to a power source 22 and the other opposite ends connected to relays CR1 and CR2 respectively through an amplifier 24 and a discriminating circuit 25 which is adapted to discriminate the polarity of the output from the bridge circuit 23.

In operation, the drive motor 9 is set in motion, whereupon the hydraulic pump 7 is driven by said drive motor and the operating oil 2 in the oil reservoir 1 is pumped up through the pipe 11 and fed into the hydraulic cylinder 16 through the pipe 14. The temperature of the operating oil being fed into the hydraulic cylinder 16 is detected by the first temperature detector TH1 and a voltage corresponding to the detected operating oil temperature is applied on the bridge circuit 23. On the other hand, the ambient temperature of the associated machine is detected by the second temperature detector TH2 and a voltage corresponding to the detected ambient temperature is also applied on the bridge circuit 23. The balancing variable resistor R3 in the bridge circuit 23 is so adjusted that the bridge circuit will remain in a balanced state when the difference between the input voltages from the temperature detectors TH1 and TH2 is of a predetermined value, but the balance of the bridge circuit will be lost, emitting an output signal, when the input voltage difference is smaller than the predetermined value or the difference between the operating oil temperature and the ambient temperature becomes smaller than a predetermined temperature range. The output voltage from the bridge circuit 23 is applied on the relay CR1 through the discriminating circuit 25, to actuate said relay and thereby a contact cr1 in the electric wire 4 is closed for energizing the heater 3. Thus, the operating oil 2 in the oil reservoir 1 is heated and the temperature of the operating oil circulating through the pipes 11 and 14 is elevated. As the temperature of the circulating operating oil is elevated, the output from the temperature detector TH1 is raised, so that the difference between the inputs from the temperature detectors TH1 and TH2 becomes larger bringing the bridge circuit 23 in a balanced state again. Therefore, the relay CR1 is deenergized and the contact cr1 in the electric wire 4 is opened interrupting the current supply to the heater 3.

Now, when the temperature of the operating oil being fed into the hydraulic cylinder 16 is elevated with respect to the ambient temperature and becomes higher than a predetermined temperature, the output voltage difference between the temperature detectors TH1 and TH2 in the bridge circuit 23 becomes greater than the predetermined value, so that the balance of said bridge circuit is lost and the output voltage from the bridge circuit is applied, in this case, on the relay CR2 through the discriminating circuit 25 to actuate said relay. Therefore, a switch in the electric wire 6 is closed and the cooler 5 is set in operation to cool the operating oil 2 in the oil reservoir 1. In the manner described, it is possible to change the temperature of the circulating operating oil with the ambient temperature as shown in the chart of FIG. 2 and thereby to maintain the associated machine in a thermally stable condition throughout the period of operation very easily. From the foregoing description, it will be understood that the use of the oil temperature control system according to the present invention is of great advantage in maintaining the high precision of the products produced by, e.g. an automatic machine provided with a hydraulically operative copying device or other mechanism.

FIGS. 5 and 6 show another embodiment of the present invention, in which the same reference numerals indicate similar parts as in FIGS. 3 and 4. In this embodiment, the oil reservoir is composed of high temperature oil reservoir 29 for containing a high temperature oil 28 and a low temperature oil reservoir 31 for containing a low temperature oil 30, which are separated from each other by a partition wall 27. The interior wall of the low temperature oil reservoirs 31 is lined with a heat-insulating layer 32. The oil in the high temperature oil reservoir 29 is maintained at a temperature higher than the ambient temperature by a heating pipe 3a connected to a heater 3, whereas the oil in the low temperature oil reservoir 31 is maintained at a temperature lower than the ambient temperature by a cooling pipe 5a connected to a cooler 5 disposed exterior of the oil reservoir 26.

A pumping ratio controlling valve, generally indicated by numeral 33, has a spool 35 slidably disposed in the interior axial hollow thereof, which spool 35 is composed integrally of a pair of symmetrical substantially cylindrical members connected with each other at their frustoconically shaped heads 34 and 34a with a cylindrical member of smaller diameter interposed therebetween. On the opposite sides of the spool 35 are formed oil chambers 36 and 37 respectively and the spool is normally held in the center of the axial hollow in the pumping ratio controlling valve 33 under the balanced and counteracting biasing forces of springs 38 and 39 which are respectively disposed in the oil chambers 36 and 37. The oil chambers 36 and 37 are in communication with a servo valve 47 to be described later, through oil passage holes bored through the opposite end walls 33a of the pumping ratio controlling valve 33. In the inner surface of the axial hollow of the controlling valve 33 are formed a pair of annular grooves 40 and 40a and these annular grooves are in communication with the respective oil reservoirs 29 and 31 through pipes 41 and 43 which are provided at the other ends thereof with strainers 42 and 44 respectively. The pumping ratio control valve 33 also has a hole 45 bore radially through the center of the wall thereof so as to communicate the axial hollow of the valve 33 with a hydraulic pump 7 through a pipe 11. The pipes 41 and 43 may be provided therein with auxiliary pumps 46 and 46a as required.

In operating the apparatus constructed as described above, the motor 9 is set in motion to drive the pump 7, whereupon the high temperature oil and the low temperature oil in the respective oil reservoir 29 and 31 are pumped up by the pump 7 through the pipes 41 and 43 respectively and introduced into the pumping ratio controlling valve 33, wherein they are mixed with each other to form an operating oil of a desired temperature and the operating oil thus prepared is fed into the hydraulic cylinder 16 through the pump 7. In this case, when the spool 35 in the pumping ratio controlling valve 33 is in a balanced position or centered in the axial hollow in said valve, the high and low temperature oils are pumped up and mixed with each other in an equal amount, so that the operating oil fed into the hydraulic cylinder consists equally of the high and low temperature oils. The bridge circuit 23, shown in FIG. 6, is held in a balanced state when the difference between the temperatures detected by the first temperature detector TH1 and the second temperature detector TH2 is of a predetermined value. However, when the temperature difference deviates from the predetermined value, the bridge circuit 23 impresses the servo valve 47, through an amplifier 24, with an output corresponding to the temperature difference to actuate said servo valve. Therefore, the pressure oil in an oil source 48 is introduced into the oil chamber 37 or 38 in the pumping ratio controlling valve 33 in an amount as determined by the size of the output from the bridge circuit. More specifically, when the temperature of the operating oil being fed into the hydraulic cylinder 16 is higher than the predetermined temperature, the output voltage from the bridge circuit 23 is impressed on the servo valve 47 to actuate the same so as to raise the pressure in the oil chamber 38 in the pumping ratio controlling valve 33 to a level in accordance with the size of the output voltage. As the pressure is raised in the oil chamber 38, the spool 35 is moved to the right, as viewed in FIG. 5, against the biasing force of the spring 39 for a distance corresponding to the pressure in the oil chamber 38. Upon displacement of the spool 35, the opening area of the annular groove 40 is decreased and the opening area of the annular groove 40a is increased, in accordance with the amount of displacement of said spool, and the ratio between the amount of the high temperature oil 28 and the amount of the low temperature oil 30 being pumped is varied accordingly. That is to say that the low temperature oil 30 is pumped up in an amount more than the high temperature oil 38 in a proportion as determined by the opening areas of the annular grooves 40 and 40a. Consequently, the temperature of the operating oil being delivered into the hydraulic cylinder 16 through the pipe 11 is lowered. On the contrary, when the temperature of the operating oil supplied into the hydraulic clinder 16 is lower than the predetermined value, the system operates reversely.

Figure 7:
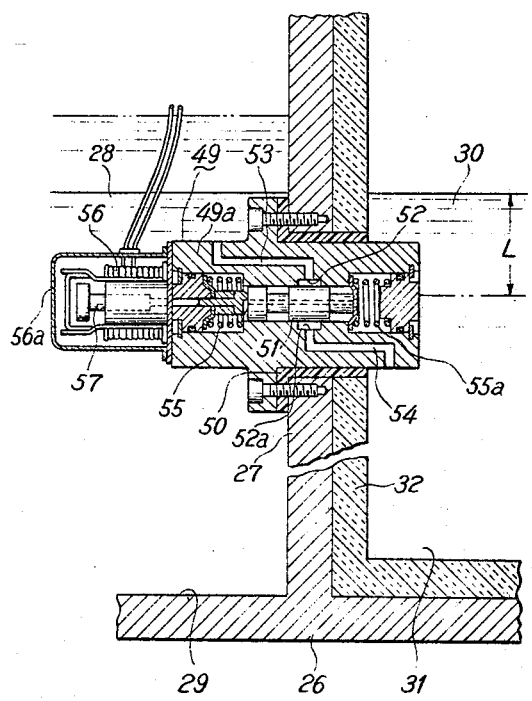
FIG. 7 is a vertical cross sectional view of an oil quantity regulating valve used in the apparatus shown in FIG. 5.

The used oil from the hydraulic cylinder 16 is returned to the high temperature oil reservoir 29 through a pipe 19, so that the level of the oil in said oil reservoir 29 rises, while the level of the oil in the low temperature oil reservoir 31 lowers, as the operation proceeds. Thus, it becomes necessary to adjust the oil levels in the respective oil reservoirs. This can be achieved by an oil quantity regulating valve generally indicated by numeral 49. As shown in detail in FIG. 7, the oil quantity regulating valve 49 has its body 49a fixedly and water-tightly secured to the partition wall 27 by means of screws or other suitable means, with a packing 50 interposed therebetween, and has one end portion thereof extending into the low temperature oil reservoir 31 through said partition wall and the lining 32. This regulating valve 49 has a spool 51 slidably disposed in a cylindrical hollow extending axially thereof. In the inner surface of the axial hollow are formed recesses 52 and 52a in confronting relation and these recess 52 and 52a are respectively in communication with the oil reservoirs 29 and 31 through channels 53 and 54 formed in the body 49a of the valve. When the spool 51 is located in the center of the axial hollow, both the recesses 52 and 52a are closed thereby, so that the communication between the channels 53 and 54 are interrupted. On that end wall of the valve body 49a which is located within the high temperature oil reservoir 29 is provided a solenoid 56 enclosed by a cover 56a. The solenoid 56 has an armature 57 slidably mounted in the axial hollow therein and the armature 57 is provided with an integral rod in alignment with the spool 51 to cause displacement of said spool. The assembly of the armature 57 and the spool 51 is held in a balanced state by the counteracting biasing forces of springs 55 and 55a which are disposed on the opposite sides of the spool 51 and retained in the axial hollow of the valve body 49a by suitable means.

Figure 8:
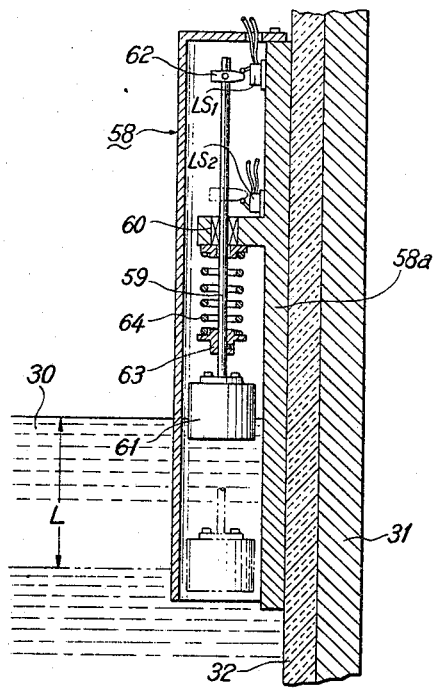
FIG. 8 is a vertical cross sectional view of an oil level detector used in the apparatus shown in FIG. 5.

The oil levels in the high and low temperature oil reservoirs 29 and 31 are detected by an oil level detector 58. In the embodiment shown in FIG. 5, the oil level detector 58 is provided to detect the level of the low temperature oil in the oil reservoir 31. In this case, the body 58a of the oil level detector 58 is fixedly secured to a side wall of the oil reservoir by suitable means. The oil level detector 58, as shown in detail in FIG. 8, comprises an operating rod 59 housed in a casing and vertically movably supported by a slide bearing 60 mounted in a bracket. The operating rod 59 has a float 61 fixed to the lower end and a dog fixed to the upper end thereof. The dog 62 is adapted to actuate limit switches LS1 and LS2 provided on the side wall of the body 59a in vertically spaced relation. At the lower portion of the operating rod 59 is fixed a stop nut 63 and a coil spring 64 is mounted on the operating rod 59 with one end bearing against said stop nut 63 and and the other end against the aforementioned bracket.

The oil level detector 58 constructed as described above operates in the following manner. When the oil level in the oil reservoir 31 is lowered by a height of L, the float 61 floating on the low temperature oil surface drops from a position indicated by the solid line to a position indicated by the phantom line accordingly. The dog 62, therefore, is carried downwardly from a position indicated by the solid line to a position indicated by the phantom line and actuates the limit switch LS2. Upon actuation of the limit switch LS2, the solenoid 56 of the oil quantity regulating valve 49 is energized, attracting the armature 57, so that the spool 52 is moved by the armature to the right as viewed in FIG. 7 against the bias of the spring 55a and held in that positon. Therefore, the channel 53 is communicated with the channel 54 through the recesses 52 and 52a and the axial hollow of the valve body 49a, and thus the oil in high temperature oil reservoir 29 flows into the low temperature oil reservoir 31 until the oil levels in both oil reservoirs become even. When the oil level in the oil reservoir 31 rises by a height of L, the float 61 is brought up to its original position indicated by the solid line and accordingly the dog is carried upwardly to its original position, indicated by the solid line, actuating the limit switch LS1. Upon actuation of the limit switch LS1, the solenoid 56 of the oil quantity regulating valve 49 is deenergized, so that the armature 57 is permitted to return to its original position under the biasing force of the spring 55 and the spool 51 is also returned to its balanced position under the biasing force of the spring 55a, closing the recesses 52 and 52a and interrupting the channels 53 and 54. By the use of the system shown in FIGS. 5 and 6, which operates in the manner described, it is possible to feed the operating oil into the hydraulic cylinder at the optimum temperature and said temperature is varied following the ambient temperature. In addition, since the oil levels in both of the oil reservoirs can be maintained even automatically, the system of this invention can be operated always under the optimum conditions compared with the conventional systems of this type.

Figure 9:
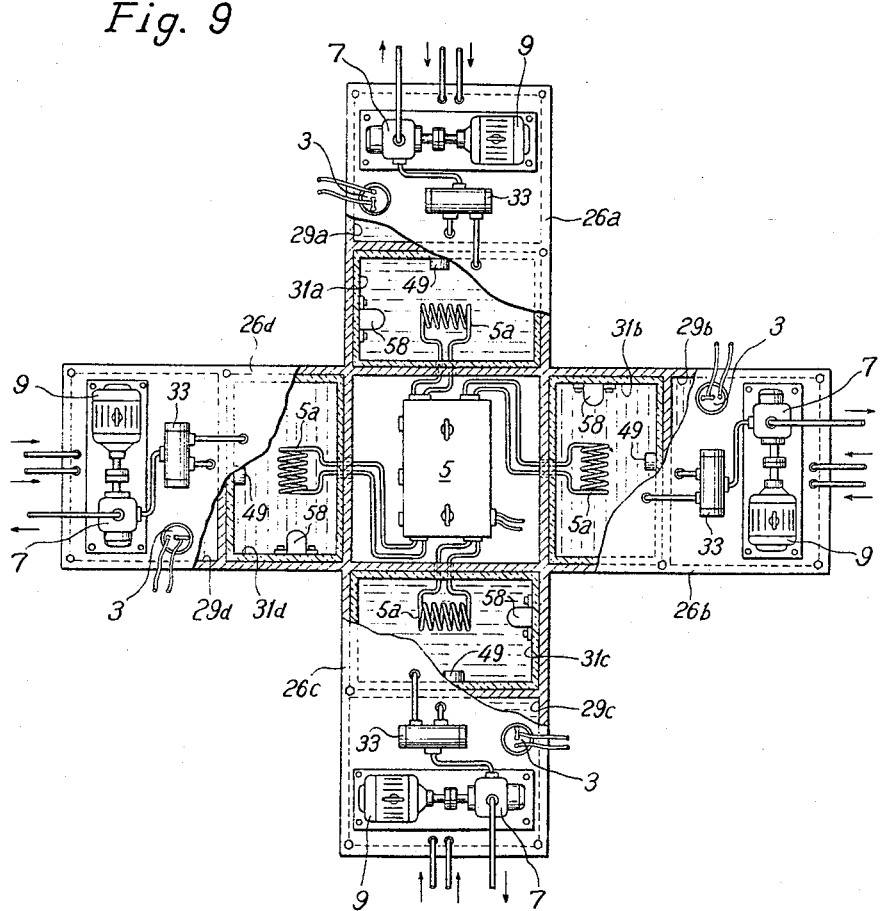
FIG. 9 is a plan view, partly in section, of a modification of the apparatus shown in FIG. 5, in which is provided a plurality of pairs of oil reservoirs.

Another form of the apparatus shown in FIG. 5 is shown in FIG. 9, in which it will be seen that a plurality of sets of oil reservoirs 26a, 26b, 26c and 26d are arranged in a cruciform shape. Each of these oil reservoirs is individually divided into a high temperature oil reservoir and a low temperature oil reservoir, and provided with a heater 3, a drive motor 9, a hydraulic pump 7, a pumping ratio regulating valve 33, an oil quantity regulating valve 49 and an oil level detector 58, for feeding the operating oil from the oil reservoir into the respective hydraulic cylinders not shown. The oils in the respective low temperature oil reservoirs 31a, 31b, 31c and 31d are cooled by a common cooler 5 disposed at the center of the cruciform layout of oil reservoirs by way of the respective cooling pipes 5a, 5b, 5c and 5d extending between the respective oil reservoirs and said cooler. By the use of this system, it is possible to simultaneously operate a plurality of hydraulic cylinders with operating oils of different optimum temperatures and to selectively use the operating oils of different temperatures so as to be suitable for particular hydraulic cylinders. As an example, in the operation of a grinding machine for superprecision work of the type in which a fluid bearing is used for supporting the grinding spindle, it is possible, by the use of the inventive oil temperature control system shown in FIG. 9, to obtain the operating oil for the fluid bearing, the operating oil for the cylinder for feeding a grinding wheel head and a table traversing cylinder, the lubricating oil to be forcibly supplied to the surfaces of various moving parts to be lubricated, and the coolant for a work piece being worked, simultaneously by only adjusting the balancing variable resistors R3 in the respective automatic balancing circuits 23 for the respective optimum oil temperatures.

Figure 10:
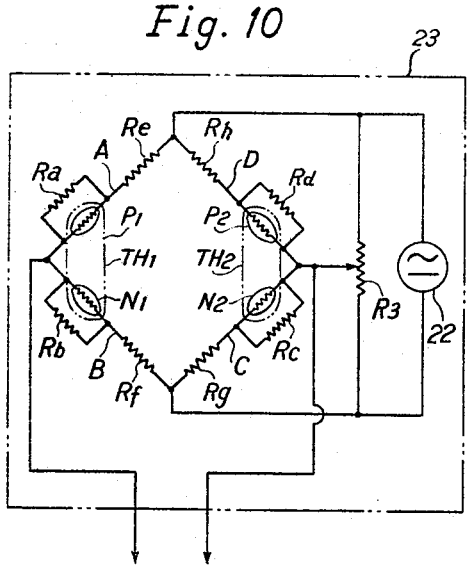
FIG. 10 is a block diagram of another form of the automatic electric balancing circuit used in the electrical temperature detecting means shown in FIGS. 4 and 6.

Referring next to FIG. 10, there is shown another form of the bridge circuit shown in FIGS. 4 and 6. In this form of the bridge circuit, the first temperature detector TH1 for detecting the oil temperature and the second temperature detector TH2 for detecting the ambient temperature each consists of a combination of a temperature detecting element of positive temperature characteristic and a temperature detecting element of negative temperature characteristic. Namely, a resistor element P1 in the arm A and a resistor element P2 in the arm D of the bridge circuit are of positive characteristic, with their resistance values increasing with temperature as represented by a curve $a$ in the chart of FIG. 11. On the other hand, a resistor element N1 in the arm B and a resistor element N2 in the arm C of the bridge circuit are of negative characteristic, with their resistance values decreasing with temperature as represented by a curve $b$ in the chart of FIG. 11. The resistor elements P1 and N1 are embedded in the temperature detector TH1, and P2 and N2 in the temperature detector TH2. These resistor elements are connected to resistors $Ra, Rb, \ldots Rh$ and the slide rheostat R3 in the manner shown.

Figure 11:
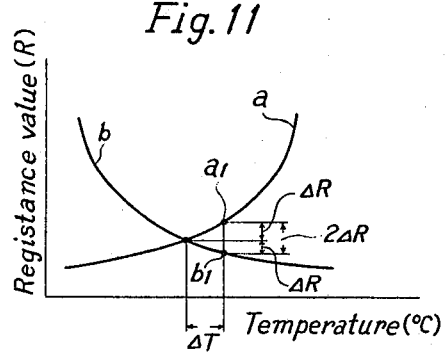
FIG. 11 is a chart illustrating the characteristic curves of the temperature detector elements used in the automatic electric balancing circuit shown in FIG. 10.

With the bridge circuit described above, when the operating oil temperature is elevated by $\Delta T$ as shown in FIG 11, the resistance value of the resistor element P1, composing the first temperature detector TH1, is increased by $\Delta R$, and the resistance value of the resistor element N1 is decreased by $\Delta R$, to values indicated by points $a_1$ and $b_1$ respectively. Therefore, the total variation in resistance value will be about $2\Delta R$ which is twice as large as the change in resistance value $\Delta R$ obtainable with either one of the resistor elements of positive characteristics or the resistor element of negative characteristic. Similarly, change in resistance value of the second temperature detector is twice as large as that obtainable when the resistor elements are used singly. Thus, it will be seen that, by employing the circuit shown in FIG. 10, the output of the bridge circuit is doubled.

The above description of the invention is intended to be illustrative and not limiting, and it is to be understood that various changes and modifications are possible to the embodiments described without departing from the spirit and scope of the invention.

What we claim is:

1. An oil temperature control system comprising an oil reservoir, a hydraulic motor, a fluid circuit through which an operating oil is circulated between said oil reservoir and said hydraulic motor, means for circulating the operating oil through said circuit, a first temperature detector for detecting the temperature of the operating oil in said circuit, a second temperature detector for detecting the ambient temperature around a machine including said hydraulic motor, means for heating the operating oil, means for cooling the operating oil, and automatic balancing means responsive to the difference between the temperatures detected by said respective temperature detectors to maintain said difference at a predetermined value by selectively actuating said heating means and said cooling means, when said difference deviates from the predetermined value, whereby the temperature of the operating oil is varied following the ambient temperature.

2. An oil temperature control system as claimed in claim 1 wherein the heating means and the cooling means are in said oil reservoir.

3. An oil temperature control system as claimed in claim 1 wherein said first and second temperature detectors each comprise a resistor element having a positive temperature characteristic and a resistor element having a negative temperature characteristic, said automatic balancing means comprising a Wheatstone bridge circuit with each of said resistor elements disposed in each arm thereof.

4. An oil temperature control system comprising heating means for heating oil in a first oil reservoir to a temperature higher than the ambient temperature around a machine, cooling means for cooling oil in a second oil reservoir to a temperature lower than that in said first oil reservoir, a pumping ratio controlling valve communicating with said respective oil reservoirs to control the ratio between the flow rates of the oils from said respective oil reservoirs to form an operating oil of a predetermined temperature by mixing the oils, a hydraulic motor on said machine, a fluid circuit through which said operating oil is circulated from said valve to one of said reservoirs through said hydraulic motor, means for circulating said operating oil through said circuit, a first temperature detector for detecting the temperature of the operating oil, a second temperature detector for detecting the ambient temperature around the machine, and automatic balancing means responsive to the difference between the temperatures detected by said first and second temperature detectors to control said valve to change said ratio between the flow rates of the oils from said respective reservoirs when said difference deviates from a predetermined value, whereby the temperature of the operating oil can be varied following the ambient temperature around the machine.

5. An oil temperature control system as claimed in claim 4 wherein said system further comprises a partition wall between said first and second oil reservoirs, an oil quantity regulating valve in said partition wall, an oil level detector disposed in one of said oil reservoirs for detecting the oil level therein, and means for communicating an output signal from said oil level detector to said oil quantity regulating valve, said oil quantity regulating valve being opened upon receiving the output signal from said oil level detector to permit the oil in one of said oil reservoirs to flow into the other said oil reservoirs.

6. An oil temperature control system as claimed in claim 4 wherein said first and second temperature detectors respectively comprise a resistor element having a positive temperature characteristic and a resistor element having a negative temperature characteristic, and said automatic balancing means comprises a Wheatstone bridge circuit with each said resistor elements disposed in each arm thereof.

7. An oil temperature control system comprising a combination of a plurality of oil reservoir units, each of which is adapted to supply an operating oil having a temperature required to a respective hydraulic device provided in a machine, each of said units comprising heating means for heating oil in a first oil reservoir to a temperature higher than the ambient temperature around the machine, cooling means for cooling oil in a second oil reservoir to a temperature lower than that in said first oil reservoir, a pumping ratio controlling valve communicating with said respective oil reservoirs to control the ratio between flow rates of the oils from said respective oil reservoirs to form an operating oil of a predetermined temperature by mixing the oils, a fluid circuit through which said operating oil is circulated from said valve to one of said reservoirs through said hydraulic device, means for circulating said operating oil through said circuit, a first temperature detector for detecting the temperature of the operating oil, a second temperature detector for detecting the ambient temperature around the machine, and automatic balancing means responsive to the difference between the temperatures detected by said first and second temperature detectors to control said valve so as to change said ratio between the flow rates of the oils from said respective reservoirs when said difference deviates from a predetermined value, whereby the temperature of the operating oil in each of said units can be varied following the ambient temperature.

References Cited

UNITED STATES PATENTS 3,066,578   12/1962   Olton _____ 165—26

ROBERT A. O'LEARY, Primary Examiner

C. SUKALO, Assistant Examiner

U.S. Cl. X.R.
165—28, 48, 107